United States Patent
Hyder et al.

(10) Patent No.: US 11,360,883 B1
(45) Date of Patent: Jun. 14, 2022

(54) INTELLIGENT REAL-TIME ADAPTIVE COHORT SELECTION FOR TESTING OF COMPUTER SECURITY APPLICATION FEATURES

(71) Applicant: Malwarebytes Inc., Santa Clara, CA (US)

(72) Inventors: Adam Hyder, Cupertino, CA (US); Raghuram Sri Sivalanka, San Ramon, CA (US); Mayank Gupta, Santa Clara, CA (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 17/161,435

(22) Filed: Jan. 28, 2021

(51) Int. Cl.
*G06F 9/44* (2018.01)
*G06F 11/36* (2006.01)

(52) U.S. Cl.
CPC ........ *G06F 11/3692* (2013.01); *G06F 11/368* (2013.01); *G06F 11/3688* (2013.01)

(58) Field of Classification Search
CPC . G06F 11/368; G06F 11/3688; G06F 11/3692
See application file for complete search history.

(56) References Cited

U.S. PATENT DOCUMENTS

| | | | |
|---|---|---|---|
| 10,936,462 B1 * | 3/2021 | Eardley | G06F 11/076 |
| 2008/0250128 A1 * | 10/2008 | Sargent | H04L 41/22 709/223 |
| 2017/0132123 A1 * | 5/2017 | DiTullio | G06F 11/3696 |
| 2017/0206283 A1 * | 7/2017 | Harpur | G06F 16/972 |
| 2018/0024918 A1 * | 1/2018 | Agarwal | G06F 11/3676 717/125 |
| 2018/0074936 A1 * | 3/2018 | Broadbent | G06F 11/36 |
| 2019/0097907 A1 * | 3/2019 | Nickolov | H04L 43/0817 |
| 2020/0126112 A1 * | 4/2020 | Leonard | G06Q 30/0201 |
| 2021/0019781 A1 * | 1/2021 | Karanth | G06Q 30/0246 |

* cited by examiner

*Primary Examiner* — Chat C Do
*Assistant Examiner* — Lenin Paulino
(74) *Attorney, Agent, or Firm* — Fenwick & West LLP

(57) ABSTRACT

A test management system utilizes an adaptive cohort selection technique to dynamically select and update a cohort of clients for testing a feature of a computer security application. The test management system selects an initial cohort based on high level parameters of the test including the feature to be evaluated and the statistical confidence level for the outcome. During the test, the test management system obtains real-time telemetry data relevant to evaluating the test. Depending on how the test is tracking relative to the test objectives, test management system may dynamically modify the cohort by expanding the size of the cohort or changing the cohort membership.

11 Claims, 3 Drawing Sheets

INTELLIGENT REAL-TIME ADAPTIVE COHORT SELECTION FOR TESTING OF COMPUTER SECURITY APPLICATION FEATURES

FIELD OF ART

The present disclosure generally relates to computer security applications, and more specifically to an intelligent cohort selection system for setting up tests of computer security application features.

BACKGROUND

Computer security applications must be highly adaptable to respond to frequently changing threats. For example, detection rules may be frequently updated as new malware is discovered. Furthermore, it may be desirable to frequently adapt behavior of security applications in response to varying networking conditions, operating system state, or user interactions. To ensure that such changes do not cause unintended consequences that may affect computing performance or even run counter to the security goals, it may be beneficial to test changes in the security application features with a small population of clients prior to a wide scale roll out.

SUMMARY

A test management system adaptively updates a cohort for testing a feature of a protection application. A set of test parameters are received for testing the feature of the protection application. The test parameters include a condition for evaluating during the test to generate a test outcome and a desired confidence level associated with the test outcome. An initial cohort is selected from a population of clients based on attributes of the population of clients that meet a model associated with the test parameters. The test is initiated by enabling the feature of the protection application for the initial cohort. During the test, telemetry data is acquired that is associated with the clients in the initial cohort. The condition of the test is evaluated based on the acquired telemetry data to determine whether the test is of sufficient scope to achieve the desired confidence level. Responsive to determining that the test is not of sufficient scope, the test parameters are modified to expand the scope of the test. Responsive to determining that the desired confidence level associated with the test outcome is met, an action is initiated based on the test outcome.

In an embodiment, selecting the initial cohort comprises selecting the model based on the test parameters in which the model specifies a set of desired client attributes. An attribute database is queried using the desired client attributes to identify a set of clients for the initial cohort based on similarities between stored attributes of the set of clients and the desired client attributes. The desired client attributes may comprise, for example, a local time associated with the clients, attributes associated with operating systems of the clients, and attributes associated with versions of the protection application installed on the clients.

In an embodiment, modifying the test parameters may comprise expanding a size of the initial cohort by enabling the feature of the protection application on additional clients, or may comprise increasing a length of a test duration of the test.

Furthermore, in an embodiment, initiating an action based on the test outcome may comprise distributing the feature to a larger population of clients outside the cohort or removing the feature from the clients in the cohort.

In further embodiments, a non-transitory computer-readable storage medium stores instructions that when executed by a processor causes the processor to execute the above-described method. In yet further embodiments, a computer device includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A test management system utilizes an adaptive cohort selection technique to dynamically select and update a cohort of clients for testing a feature of a computer security application. The test management system selects an initial cohort based on high level parameters of the test including the feature to be evaluated and the statistical confidence level for the outcome. During the test, the test management system obtains real-time telemetry data relevant to evaluating the test. Depending on how the test is tracking relative to the test objectives, test management system may dynamically modify the cohort by expanding the size of the cohort or changing the cohort membership.

Figure 1:
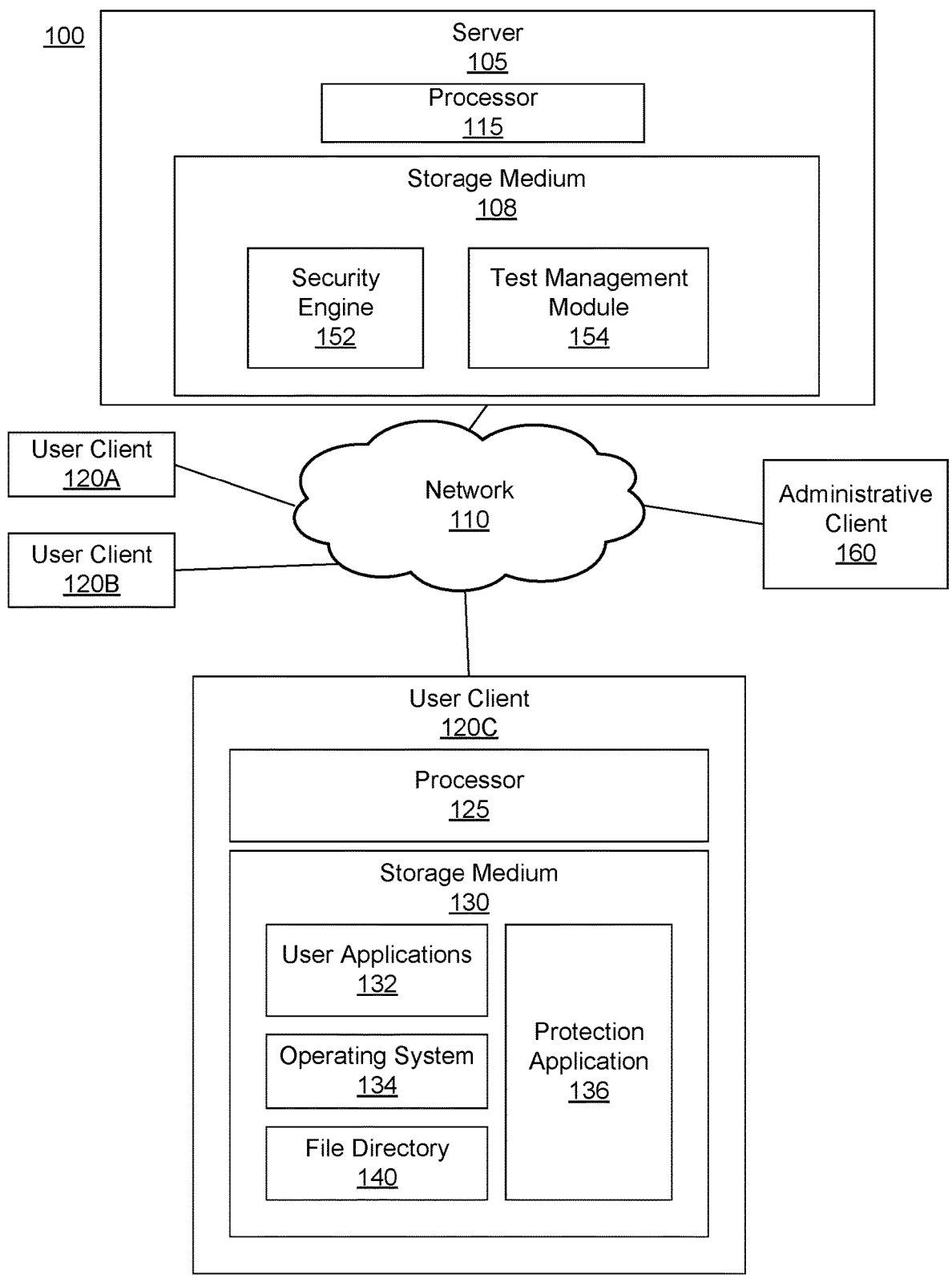
FIG. 1 is a system diagram illustrating an example embodiment of a computing environment for testing of security application features.

FIG. 1 is a system diagram illustrating an example embodiment of a system environment 100 comprising a server 105, a network 110, user clients 120A, 120B and 120C (which are collectively referenced herein as user clients 120), and an administrative client 160. For simplicity and clarity, only one server 105, one administrative client 160, and a limited number of user clients 120 are shown. However, other embodiments may include different numbers of servers 105, administrative clients 160, and user clients 120. The system environment 100 may also include different or additional entities.

The network 110 represents the communication pathways between the server 105, the administrative client 160, and the user clients 120. In one embodiment, the network 110 includes the Internet. The network 110 may also include dedicated or private communications links that are not necessarily part of the Internet such as local area networks (LAN). In one embodiment, the network 110 uses standard communications technologies and/or protocols.

Each user client 120 comprises one or more computing devices capable of processing data as well as transmitting and receiving data via the network 110. For example, a client device 120 may be a desktop computer, a laptop computer, a smart phone, a tablet computing device, an Internet of Things (IoT) device, or any other device having computing and data communication capabilities. Each user client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, and the like. In addition to storing program instructions, the storage medium 130 stores various data associated with operation of the user client 120.

In one embodiment, the storage medium 130 comprises a non-transitory computer-readable storage medium that stores a file directory 140 and various executable programs including an operating system 134, a protection application 136, and user applications 132 that are each embodied as computer-executable instructions stored to the non-transitory computer-readable storage medium. The instructions, when executed by the processor 125, cause the user clients 120 to perform the functions attributed to the programs described herein.

The operating system 134 is a specialized program that manages computer hardware resources of the user clients 120 and provides common services to the user applications 132. For example, a computer's operating system 134 may manage the processor 125, storage medium 130, or other components not illustrated such as a graphics adapter, an audio adapter, network connections, disc drives, and USB slots. A cell phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, an email client, and a web browser. In some cases, a user application 132 may be a source of malware that is unknowingly hidden in the user application 132. The malware may infect the user client 120 when the user application 132 is installed or executed. Additionally, malware may be inadvertently downloaded via a web browser, email client, or other source.

The file directory 140 stores files. Files may include system files associated with operation of the operating system 134, the user applications 132, or the protection application 136. The files may further include user files that may be created or modified by users. Examples of user files may include image files, video files, word processor documents, spreadsheet documents, and drawing files.

A protection application 136 provides various security features. For example, the protection application may include an anti-malware component that detects, stops, and removes malware. The protection application 136 may prevent new malware from being installed on a user client 120 or remove or disable existing malware that is already present on the user client 120. The protection application 136 may determine if a process is malware based on behaviors indicative of malware, based on static analysis of a file, based on emulation of a program using a sandbox, or based on a combination of factors. In one embodiment, the protection application 136 may store and/or download from the network 110, malware definitions that specify characteristics or behaviors of malware that the protection application 136 seeks to detect. The protection application 136 may also extract and send data to the server 105 for classification instead of performing detection locally. The server 105 may receive the data, perform analysis and classification and send data and instructions back to the protection application 136 to enable the user client 120 to identify and stop malicious activities.

The protection application 136 may furthermore provide other security features to prevent network-based intrusions. For example, the protection application 136 may include a firewall, a virtual private network (VPN) client, and data encryption tools. The protection application 136 may furthermore provide other features to prevent malicious activity or recover from attacks such as user authentication tools and data recovery tools. These features may similarly be updated or controlled based on information received from the server 105.

The server 105 is a computer system configured to store, receive, and transmit data to the user clients 120 via the network 110. The server 105 may include a singular computing system, such as a single computer, or a network of computing systems (e.g., a cloud server), such as a data center or a distributed computing system. In one embodiment, the server 105 includes a processor 115 for manipulating and processing data, and a storage medium 108 for storing data and program instructions associated with various applications. The storage medium 108 may include both volatile memory (e.g., random access memory) and non-volatile storage memory such as hard disks, flash memory, flash drives, external memory storage devices, USB drives, and the like. The server 105 may receive data from the user clients 120 and administrative client 160 and may also send data to the user clients 120 and administrative client 160.

The storage medium 108 comprises a security engine 152 and a test management module 154. The security engine 152 interacts with the protection application 136 to facilitate operation of the security features. For example, the security engine 152 may generate and distribute malware definitions utilized by the protection application 136 to detect and remediate malware. The security engine 152 may furthermore generate configurations for VPN clients, firewalls, or other security functions executed by protection application 136. In addition, the security engine 152 may perform certain security functions on the server 105 based on information provided by the protection application 136, such as, for example, performing remote malware detection and sending detection results based on samples or other data communicated from the protection application 136.

The test management module 154 manages testing of security application features associated with the protection application 136. During a test, a particular feature is provided to or enabled on a cohort of user clients 120 and data relating to the feature is collected from the user clients 120 in the cohort. In some cases, a test may be a binary test to determine whether the feature should be rolled out to a larger population of user clients 120 or whether it should be rolled back. In other cases, a test may be used to select between two or more different variants of a feature (e.g., an AB test) to determine which variant should be widely rolled out. In this case, the cohort may be divided into subsets of user clients 120, with each subset enabling a different variant of the features to be tested. Examples of tests may include, for example, a test for determining whether a new malware definition results in a sufficiently low rate of false positives, a test to determine whether a configuration of a VPN or other security feature achieves a desired performance level, a test to determine whether a user message to users of the protection application 136 receives a sufficiently positive response, a test to determine which variant of a user interface receives higher usage level, a test to determine whether an update to an executable file results in a low rate of fault conditions, and so on.

The test management module 154 may utilize an adaptive cohorting technique to adaptively select and modify the cohort for testing in automated way according to test objectives configured by a test creator via the administrative client 160. For example, the test management module 154 may automatically select an initial cohort of user clients on which the feature to be tested is enabled. During the test, the test management module 154 may monitor various telemetry data from the user clients 120 in the initial cohort. At various intervals during the test, the test management module 154 may detect if the cohort should be expanded or otherwise modified to increase the likelihood of the test achieving the objectives. Furthermore, the test management module 154 may intelligently determine when to discontinue the test, either when the objectives are met or when they are unlikely to be achieved even with permissible modifications to the objectives.

The administrative client 160 comprises a client device accessible by an administrator of the server 105. The administrative client 160 may provide an administrative user interface that enables an administrator to configure tests and view test results associated with the test management module 154.

Figure 2:
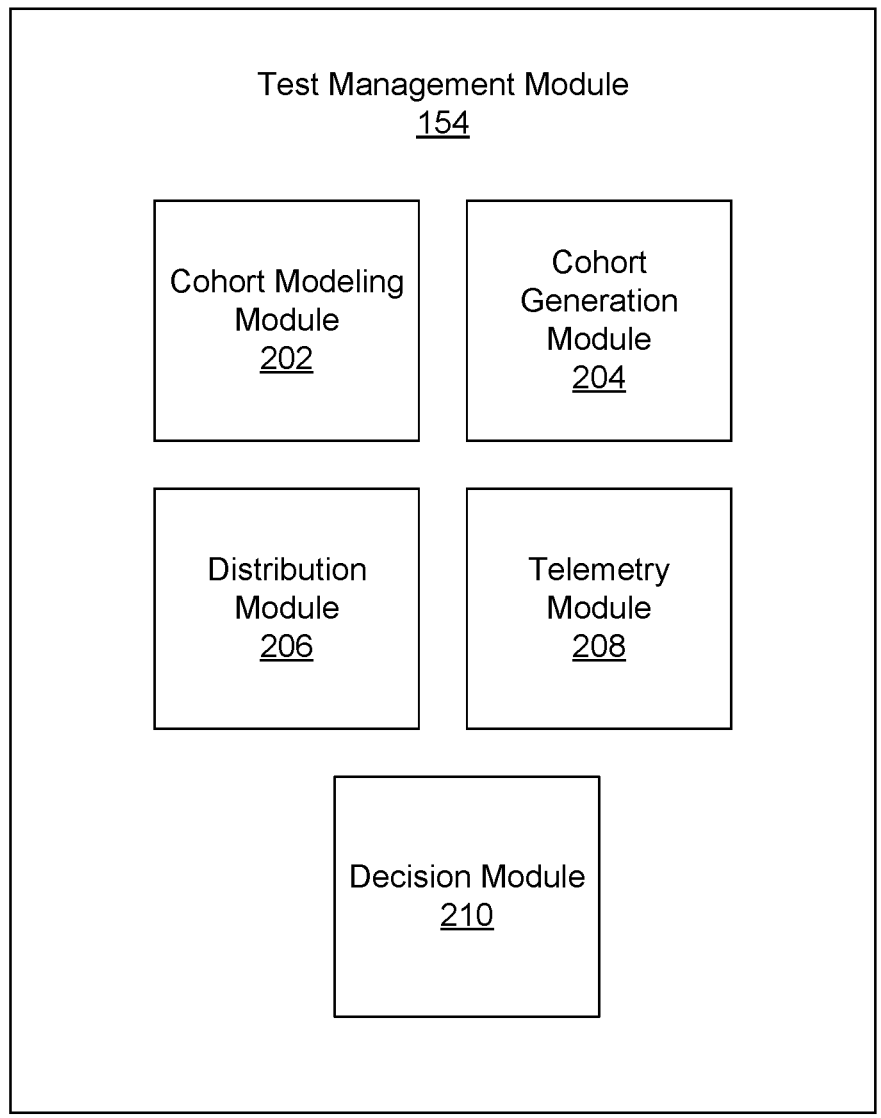
FIG. 2 is a block diagram of a test management module for managing testing of security application features.

FIG. 2 is a block diagram illustrating an example embodiment of a test management module 154. The test management module 154 comprises a cohort modeling module 202, a cohort generation module 204, a distribution module 206, a telemetry module 208, and a decision module 210. In alternative embodiments, the test management module 154 may include additional or different components.

The cohort modeling module 202 comprises a database of attributes relating to different user client 120 and users associated with the user clients 120. For example, the cohort modeling module 202 may store identifiers for each user client 120 and store information such as geographic location information, an operating system installed on the client, a version of the protection application 136 installed on the user client 120, information about user applications 132 installed on the user client 120, usage data associated with the user client 120 or other information that may be useful to cohort selection. The cohort modeling module 202 may similarly include identifiers for different users and associated information about the users such as, for example, location information, profile information, usage data, or other information that may be useful to cohort selection.

The cohort modeling module 202 may store a set of models that each specify a set of desired attributes for a cohort associated with a particular type of test. For example, a model for testing malware definition updates may specify that the desired cohort includes a set of user clients 120 having a variety of different operating systems 134 and user applications 132 installed and are predicted to meet specified usage requirements during the test. A model for testing performance of different possible VPN providers may specify that a desired cohort includes a set of user clients 120 that have historically used a VPN client on a regular basis during a time window associated with the test. A model for testing a user messaging campaign may specify that a desired cohort includes a set of user clients 120 associated with users spanning a range of demographics and that have historically responded to messages sent via the protection application 136.

In an embodiment, the models for different tests may furthermore limit the candidate clients that can be added to a testing cohort to user clients 120 that have either affirmatively opted-in to a testing program, or alternatively, that have not opted out. Thus, the test management module 202 may enable users to decide whether or not their associated user clients 120 will be available to participate in a test.

The cohort generation module 204 obtains a set of test parameters for carrying out a test and selects a cohort of user clients 120 based on the test parameters. The test parameters may be initially provided from a test creator via an administrative interface on the administrative client 160, but may be adaptively updated within certain allowed constraints as described further below. The test parameters may comprise a condition to be tested and a set of test objectives. The condition defines the possible outcomes of the test. In some tests, the condition may be a binary condition that evaluates to either a positive or negative outcome. For example, the condition may evaluate whether or not a certain rate of false positives are encountered in response to an updated malware definition. In another example, the condition may evaluate whether or not a specified percentage of users respond affirmatively to a user message. In yet another example, the condition may evaluate whether or not a certain level of performance is achieved in response to a particular configuration of a VPN or other security application. In other types of tests (e.g., AB tests), the condition may evaluate to a selection of one of a set of possible variants of a feature. For example, a condition may evaluate whether a first configuration or a second configuration of a VPN achieves better network performance. In another example, a condition may evaluate whether users prefer a first layout of a user interface or a second layout of the user interface. In further examples, three or more possible variants may be concurrently tested.

The test objectives may be independent of the condition and specify criteria for reaching a decision on the condition under test. For example, the test objectives may specify a minimum confidence level associated with a successful test that represents the statistical significance of the test outcome based on the cohort. Here, a test configured with a very high minimum confidence level means that the evaluation of the condition based on the cohort is highly likely to be representative of the outcome over a much larger population. On the other hand, a low minimum confidence level means that it is acceptable to have more uncertainty whether the outcome from the cohort is truly representative of a larger population. The test objectives may furthermore specify a desired minimum and or maximum time duration for the test, a desired minimum and/or maximum cohort size, or other testing parameters.

Based on the test parameters, the cohort generation module 204 determine an appropriate size of the cohort, selects an appropriate model, and identifies an initial set of clients for the cohort that meets the model for the given test parameters. For example, the cohort generation module 204 queries the attribute database of the cohort modeling module 202 to identify a set of user clients 120 having the attributes specified by the model associated with the configured test. Here, the size and makeup of the cohort may depend on parameters such as the operating systems involved in the tests, the start time of the test, the duration of the test, expected behavior of users during the test window, the confidence level, or other factors. For example, the start time of the test and its duration may be used to determine geographic locations that are likely to be most active during the test. The cohort size may be determined based on the predicted activity level during the test duration. For example, a test configured for a short duration at a start time when activity is predicted to be low may warrant a larger cohort size than a test configured for a long duration at a start time when the activity is predicted to be high. Furthermore, a test configured with a high minimum confidence level may warrant a larger cohort size to obtain the desired statistical significance than a test configured for a low minimum confidence level.

The cohort generation module 204 may furthermore adaptively update the cohort during the test, either in response to changing attributes of the user clients 120 or in response to changing test parameters. For example, given a model that specifies a desired local time range of the user clients 120 in the cohort, the best matching user clients 120 may change throughout the day to include user clients 120 in different time zones. Furthermore, the best matching user clients 120 may change as usage patterns on those user clients 120 evolve or as user applications 132 are installed, removed, or updated from the user clients 120. Additionally, the cohort generation module 204 may adaptively update the cohort in response to changing test parameters. For example, during the test, the test parameters may change in a way that causes the cohort size to expand or contract, or may otherwise make it desirable for a different set of user clients 120 to be included in the cohort.

The distribution module 206 distributes, or otherwise enables, the security feature associated with the test to the user clients 120 in the selected cohort. For example, if the test relates to an update to a set of malware definitions, the distribution module 206 distributes the updated definitions to the user clients 120 in the selected cohort. If the test relates to a messaging campaign to different users, the distribution module 206 distributes the relevant messages to user clients 120 associated with the users in the cohort. If the test relates to a VPN configuration, the distribution module 206 distributes an appropriate configuration to user clients 120 in the cohort. In the case of an AB test, different subsets of the cohort may receive different versions of the feature being tested. The distribution module 206 may dynamically enable or disable the feature under test on different user clients 120 during the test as the cohort adaptively changes.

The telemetry module 208 obtains data from the user clients 120 in the cohort during the test that are relevant to evaluating the test outcome and to evaluating whether or not the test objectives have been met. The data may comprise, for example, usage and behavior information, downloads to the user client 120, malware detection information, performance data, network connectivity information, or other state information relevant to the specific test.

The decision module 210 obtains the relevant telemetry data and controls various aspects of the test in response to the telemetry data. Controlling the test may include determining to terminate the test at a particular time or determining to modify the test parameters during the test. Here, the decision module 210 may make determinations in substantially real-time as the telemetry data is being received during a test. For example, the decision module 210 may evaluate the accumulated telemetry data associated with a test at various intervals during the test. At each evaluation interval, the decision module 210 may determine (a) that the test is progressing but the test objectives are not yet reached and the test should continue without changing the test parameters; (b) that the test objectives have been met and an outcome can be determined without the test progressing further; (c) that the test is not sufficiently progressing towards achieving the test objectives, but the test parameters can be modified to potentially reach the test objectives; or (d) that the test is not sufficiently progressing towards achieving the test objectives, and there are no allowed or feasible modifications to the test parameters that would enable the test objectives to be met.

When the decision module 210 determines that the test objectives are met, the decision module 210 may end the test without the test progressing further. The decision module 210 may then relay the outcome to the distribution module 206. For example, in the case of a positive/negative test, the decision module 210 may either control the distribution module 206 to further roll out a feature associated with the test (in the case of a positive outcome), or may roll back a feature associated with the test (in the case of a negative outcome). Alternatively, in the case of an AB test, the decision module 210 may cause the distribution module 206 to roll out the preferred version of the feature (either version A or version B) as determined by the test.

In the case that the decision module 210 determines that the test is not sufficiently progressing towards achieving the goals, the decision module 210 may modify the test parameters, for example, by increasing the size of the cohort, increasing the duration of the test, or both, to the extent such changes are allowed within any configured parameter constraints. For example, the decision module 210 may determine that rate of receipt of relevant telemetry data from the current cohort is insufficient to reach the configured confidence level within the set time duration. If the decision module 210 determines to increase the size of the cohort, the cohort generation module 202 obtains modified cohort selection parameters (e.g., a new cohort size) and selects the new cohort accordingly. The distribution module 206 then enables the feature being tested on new cohort members and the test continues.

In the case that the decision module 210 determines that the test parameters cannot be modified in a way that will enable the test objectives to be met (e.g., due to configured parameter constraints or unreliable data) the test may be determined. Here, a notification may be sent to the administrative client 160 to inform the test creator of the failure and enable the test creator to modify or remove the test.

Figure 3:
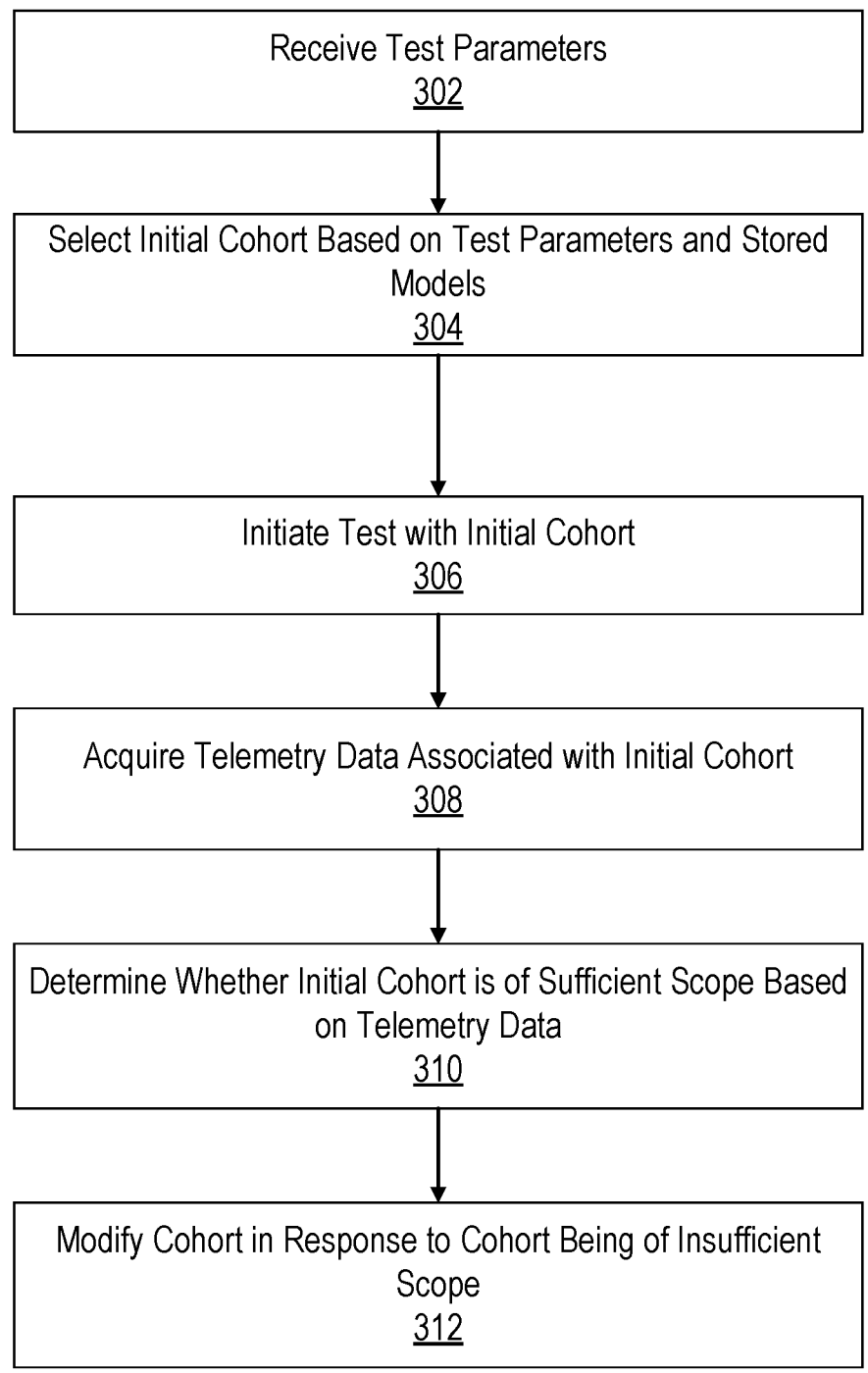
FIG. 3 is a flowchart illustrating an embodiment of a process for adaptively updating a cohort associated with testing of security application features.

FIG. 3 illustrates an example embodiment of a process for adaptively updating a cohort for testing of a feature relating to a computer security application. A test management module 154 receives 302 a set of test parameters. The test parameters may comprise a condition to be tested that defines possible outcomes of the test and a set of test objectives that define how the test will be conducted and how a determination between the possible outcomes will be made. The test management module 154 selects 304 an initial cohort based on the test parameters and a set of stored models. Here, the test parameters are mapped to a particular model that defines a set of attributes that are desirable in a cohort, and an initial cohort is selected from a population of candidate user clients 120 that best meet the attributes specified in the model. The test management module 154 initiates 306 the test using the initial cohort. For example, the test management module 154 enables the feature under test on a set of user clients 120 associated with the initial cohort. During the test, the test management module 154 acquires 308 telemetry data associated with the initial cohort. At various intervals during the test, the test management module 154 evaluates the history of received telemetry data to determine 310 whether the current cohort is of sufficient scope to meet the test objectives. Responsive to determining that the cohort is not of sufficient scope, the test management module 154 modifies 312 the cohort, for example, by expanding the size of the cohort or replacing members of the cohort. The test management module 154 may furthermore modify other test parameters such as the duration of the test or the desired confidence level. Alternatively, the test may be ended when the test management module 154 either determines that the test objectives are met, or the that modifications to the test parameters to enable the test objectives to be met are not possible.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for adaptively updating a cohort for testing a feature of a protection application, the method comprising:
   receiving a set of test parameters for testing the feature of the protection application, the test parameters including a condition for evaluating during the test to generate a test outcome regarding the feature of the protection application, and a minimum confidence level associated with the test outcome;
   automatically selecting from a population of clients, an initial cohort based on attributes of the population of clients that meet a model associated with the test parameters, wherein selecting the initial cohort comprises:
      selecting, based on the test parameters, a model specifying a set of desired client attributes, one of the desired client attributes being a local time associated with the population of clients; and
      querying an attribute database using the desired client attributes to identify a set of clients for the initial cohort based on similarities between stored attributes of the set of clients and the desired client attributes;
   initiating the test, wherein the initiation comprises enabling the feature of the protection application for the initial cohort;
   during the test, acquiring telemetry data associated with the clients in the initial cohort;
   evaluating, during the test and based on the acquired telemetry data, the condition of the test;
   determining a confidence level associated with the test outcome in view of the condition;
   determining, based on a comparison between the determined confidence level and the minimum confidence level, whether the test is of sufficient scope to achieve the minimum confidence level for the test outcome regarding the feature of the protection application;
   responsive to determining that the test is not of sufficient scope, automatically expanding a size of the initial cohort by enabling the feature of the protection application on additional clients; and
   responsive to determining that the minimum confidence level associated with the test outcome is met, initiating an action based on the test outcome, wherein initiating the action comprises removing the feature from the clients in the initial cohort.

2. The method of claim 1, wherein the desired client attributes further comprise at least one of:
   attributes associated with operating systems of the clients and attributes associated with versions of the protection application installed on the clients.

3. The method of claim 1, wherein acquiring the telemetry data comprises at least one of: download data, usage data, and behavior data of the clients.

4. The method of claim 1, further comprising increasing a length of a test duration of the test.

5. The method of claim 1, wherein the evaluating the condition comprises determining whether or not the telemetry data meets specified criteria associated with the feature.

6. The method of claim 1, wherein the evaluating the condition comprises selecting a preferred variant of the feature between at least a first variant and a second variant.

7. A non-transitory computer-readable storage medium comprising instructions for adaptively updating a cohort for testing a feature of a protection application, the instructions when executed by a processor causing the processor to perform steps including:
   receiving a set of test parameters for testing the feature of the protection application, the test parameters including a condition for evaluating during the test to generate a test outcome regarding the feature of the protection application, and a minimum confidence level associated with the test outcome;
   automatically selecting from a population of clients, an initial cohort based on attributes of the population of clients that meet a model associated with the test parameters, wherein selecting the initial cohort comprises:
      selecting, based on the test parameters, a model specifying a set of desired client attributes, one of the desired client attributes being a local time associated with the population of clients; and
      querying an attribute database using the desired client attributes to identify a set of clients for the initial cohort based on similarities between stored attributes of the set of clients and the desired client attributes;
   initiating the test, wherein the initiation comprises enabling the feature of the protection application for the initial cohort;
   during the test, acquiring telemetry data associated with the clients in the initial cohort;
   evaluating, during the test and based on the acquired telemetry data, the condition of the test;
   determining a confidence level associated with the test outcome in view of the condition;
   determining, based on a comparison between the determined confidence level and the minimum confidence level, whether the test is of sufficient scope to achieve the minimum confidence level for the test outcome regarding the feature of the protection application;
   responsive to determining that the test is not of sufficient scope, automatically expanding a size of the initial cohort by enabling the feature of the protection application on additional clients; and
   responsive to determining that the minimum confidence level associated with the test outcome is met, initiating an action based on the test outcome, wherein initiating the action comprises removing the feature from the clients in the initial cohort.

8. The non-transitory computer-readable storage medium of claim 7, wherein the steps further include increasing a length of a test duration of the test.

9. The non-transitory computer-readable storage medium of claim 7, wherein the evaluating the condition comprises determining whether or not the telemetry data meets specified criteria associated with the feature.

10. The non-transitory computer-readable storage medium of claim 7, wherein the evaluating the condition comprises selecting a preferred variant of the feature between at least a first variant and a second variant.

11. A computer device comprising:
   a processor; and
   a non-transitory computer-readable storage medium comprising instructions for adaptively updating a cohort for testing a feature of a protection application, the instructions when executed by the processor causing the processor to perform steps including:
      receiving a set of test parameters for testing the feature of the protection application, the test parameters including a condition for evaluating during the test to generate a test outcome regarding the feature of the protection application, and a minimum confidence level associated with the test outcome;
      automatically selecting from a population of clients, an initial cohort based on attributes of the population of clients that meet a model associated with the test parameters, wherein selecting the initial cohort comprises:
         selecting, based on the test parameters, a model specifying a set of desired client attributes, one of the desired client attributes being a local time associated with the population of clients; and
         querying an attribute database using the desired client attributes to identify a set of clients for the initial cohort based on similarities between stored attributes of the set of clients and the desired client attributes;
      initiating the test, wherein the initiation comprises enabling the feature of the protection application for the initial cohort;
      during the test, acquiring telemetry data associated with the clients in the initial cohort;
      evaluating, during the test and based on the acquired telemetry data, the condition of the test;
      determining a confidence level associated with the test outcome in view of the condition;
      determining, based on a comparison between the determined confidence level and the minimum confidence level, whether the test is of sufficient scope to achieve the minimum confidence level for the test outcome regarding the feature of the protection application;
      responsive to determining that the test is not of sufficient scope, automatically expanding a size of the initial cohort by enabling the feature of the protection application on additional clients; and
      responsive to determining that the minimum confidence level associated with the test outcome is met, initiating an action based on the test outcome, wherein initiating the action comprises removing the feature from the clients in the initial cohort.

* * * * *